US012583345B2

(12) United States Patent
Sato

(10) Patent No.: US 12,583,345 B2
(45) Date of Patent: Mar. 24, 2026

(54) VEHICLE CHARGING APPARATUS, VEHICLE CHARGING CONTROL METHOD, AND VEHICLE CHARGING SYSTEM

(71) Applicant: HITACHI ASTEMO, LTD., Hitachinaka (JP)

(72) Inventor: Akihiro Sato, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 18/839,820

(22) PCT Filed: May 29, 2023

(86) PCT No.: PCT/JP2023/019842
§ 371 (c)(1),
(2) Date: Aug. 20, 2024

(87) PCT Pub. No.: WO2023/234234
PCT Pub. Date: Dec. 7, 2023

(65) Prior Publication Data
US 2025/0170913 A1 May 29, 2025

(30) Foreign Application Priority Data
Jun. 3, 2022 (JP) ................................. 2022-090713

(51) Int. Cl.
*B60L 53/22* (2019.01)
*H02J 7/00* (2006.01)
*H02J 7/34* (2006.01)
(52) U.S. Cl.
CPC ........ *B60L 53/22* (2019.02); *H02J 7/007182* (2020.01); *H02J 7/345* (2013.01); *B60L 2210/10* (2013.01); *H02J 2207/20* (2020.01)

(58) Field of Classification Search
CPC ....................................................... B60L 53/22
See application file for complete search history.

(56) References Cited

FOREIGN PATENT DOCUMENTS

| EP | 2978101 A1 * | 1/2016 | .............. B60L 53/66 |
| JP | 2014-082849 A | 5/2014 | |

OTHER PUBLICATIONS

International Search Report dated Jul. 11, 2023 issued in International Application No. PCT/JP2023/019842, with English translation, 5 pages.

(Continued)

*Primary Examiner* — Daniel Kessie
(74) *Attorney, Agent, or Firm* — FOLEY & LARDNER LLP

(57) ABSTRACT

In one aspect of a vehicle charging apparatus, a vehicle charging control method, and a vehicle charging system of the present invention, there is provided a charging circuit, an input side of the charging circuit being connected to an external power source via a first switching device and an output side of the charging circuit being connected to a vehicle driving battery in the order of a DC/DC converter and a second switching device, in which the DC/DC converter is connected to an auxiliary battery. When the voltage of the auxiliary battery drops, the charging circuit is actuated in a state in which the second switching device is open to start charging the auxiliary battery, and then the second switching device is closed to start charging the vehicle driving battery. This allows stable charging of the vehicle driving battery even when the auxiliary battery is in the voltage drop situation.

6 Claims, 5 Drawing Sheets

(56)        References Cited

OTHER PUBLICATIONS

International Preliminary Report on Patentability dated Nov. 7, 2024 issued in International Application No. PCT/JP2023/019842, with English translation, 10 pages.

\* cited by examiner

VEHICLE CHARGING APPARATUS, VEHICLE CHARGING CONTROL METHOD, AND VEHICLE CHARGING SYSTEM

DESCRIPTION

Technical Field

The present invention relates to a vehicle charging apparatus, a vehicle charging control method, and a vehicle charging system.

Background Art

A vehicle charging apparatus of Patent Document 1 includes a charging circuit that converts an AC voltage supplied from an external power source via Electric Vehicle Supply Equipment (EVSE) into a DC voltage and uses the DC voltage to charge a battery, a charging control unit that controls the charging circuit and changes a potential of a signal line of a pilot signal output from a Control Pilot (CPLT) control circuit in the EVSE, and capacitor C that is charged by the pilot signal until the CPLT control circuit starts communicating with the charging control unit.

If the power source cannot be secured at the time of activating the charging control unit, the power charged in capacitor C is supplied to the charging control unit as a driving power source.

REFERENCE DOCUMENT LIST

Patent Document

Patent Document 1: JP2014-082849 A

SUMMARY OF THE INVENTION

Problem to be Solved by the Invention

A vehicle charging apparatus may be provided with a switching device (relay) that electrically disconnects a vehicle driving battery for the purpose of safely charging the vehicle driving battery and actuating a DC/DC converter.

However, if the voltage of an auxiliary battery drops, it is difficult to stably actuate the high-voltage switching device by using only auxiliary power such as the power of the capacitor that is charged by the pilot signal, and thus, the vehicle driving battery may not be charged.

The present invention has been made in view of the circumstances of the related art, and an object of the present invention is to provide a vehicle charging apparatus, a vehicle charging control method, and a vehicle charging system that are capable of ensuring the safety of charging and allowing stable charging of a vehicle driving battery even when the auxiliary battery is in the voltage drop situation.

Means for Solving the Problem

According to one aspect of the present invention, there is provided a charging circuit that charges a vehicle driving battery, an input side of the charging circuit being connected to an external power source via a first switching device and an output side of the charging circuit being connected to the vehicle driving battery in the order of a DC/DC converter and a second switching device, the DC/DC converter connected to an auxiliary battery that is a drive source for an in-vehicle device; a charging control unit that controls the charging circuit and is connected to a signal line of a pilot signal output from a switching control circuit that controls the first switching device; an external power supply enabling circuit connected to the signal line to change a potential of the signal line; and a power supply unit that supplies power to the charging control unit.

Effects of the Invention

According to the present invention, it is possible to ensure the safety of charging, and to stably charge the vehicle driving battery even when the auxiliary battery is in the voltage drop situation.

MODE FOR CARRYING OUT THE INVENTION

Hereinafter, embodiments of a vehicle charging apparatus, a vehicle charging control method, and a vehicle charging system according to the present invention will be described with reference to the drawings.

Figure 1:
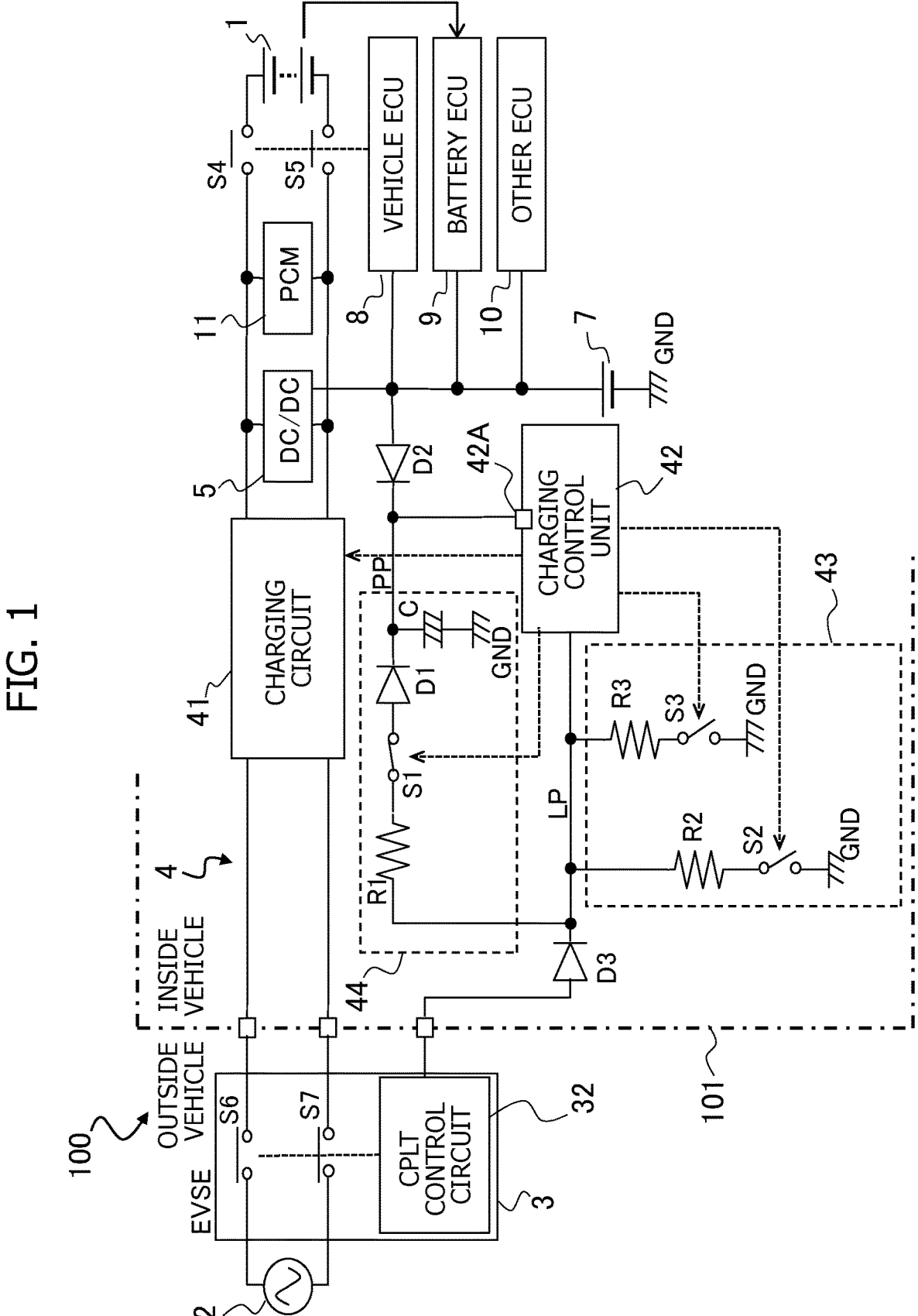
FIG. 1 is a configuration diagram illustrating an aspect of a vehicle charging system that includes a vehicle charging apparatus.

FIG. 1 is a configuration diagram of a vehicle charging system 100 for an electric vehicle or the like.

Vehicle charging system 100 includes a vehicle driving battery 1 mounted in a vehicle 101; an external power source 2 and Electric Vehicle Supply Equipment (EVSE) 3 that are external to vehicle 101; and a vehicle charging apparatus 4, a DC/DC converter 5, a Powertrain Control Module (PCM) 11, switching devices S4, S5, and an auxiliary battery 7 that are included in vehicle 101.

Here, EVSE 3 is connected to external power source 2, and vehicle charging apparatus 4 is detachably connected to EVSE 3 via the charging cable.

Furthermore, switching devices S4 and S5 are arranged between DC/DC converter 5 and vehicle driving battery 1, and auxiliary battery 7 is connected to DC/DC converter 5.

Vehicle driving battery 1 is the high-voltage battery that is used as the drive source for the travelling motor of vehicle 101, and is constituted by the secondary battery such as a lithium-ion battery.

External power source 2 is the AC power source for general household use, or the AC power source that is provided in the outdoor-installed charging facility.

EVSE 3 is the electric circuit switching unit connected to external power source 2 at the outside of vehicle 101. EVSE 3 has switching devices S6, S7 that open and close the connection circuit between external power source 2 and vehicle charging apparatus 4 (a charging circuit 41 described later), and a Control Pilot (CPLT) control circuit 32 as the switching control circuit that controls switching devices S6, S7.

Switching devices S6 and S7 are constituted by, for example, relays, and electrically connect or shut off external power source 2 and vehicle charging apparatus 4 (charging circuit 41 described later) of vehicle 101.

CPLT control circuit 32 controls on and off (opening and closing) of switching devices S6 and S7, and generates a pilot signal CPLT.

Vehicle charging apparatus 4 mounted in vehicle 101 has charging circuit 41, a charging control unit 42, an external power supply enabling circuit 43, and a capacitor charging circuit 44.

The input side of charging circuit 41 is connected to external power source 2 via switching devices S6 and S7.

Charging circuit 41 is constituted by a known circuit that includes a power factor correction circuit, a DC/DC converter, a rectifier circuit, and the like, and converts an AC voltage supplied from external power source 2 into a predetermined DC voltage based on a control signal from charging control unit 42.

Charging control unit 42 includes a microcomputer, and controls charging circuit 41 such that vehicle driving battery 1 is charged based on power supplied from external power source 2.

Charging control unit 42 is connected to CPLT control circuit 32 via a pilot signal line LP that includes a diode D3, and acquires pilot signal CPLT generated by CPLT control circuit 32 via pilot signal line LP.

Diode D3 is connected to pilot signal line LP such that the anode is toward CPLT control circuit 32 and the cathode is toward charging control unit 42.

External power supply enabling circuit 43 is a circuit for selectively lowering the potential of pilot signal line LP to a prescribed voltage, and has the series circuit (first potential change circuit) in which a resistor R2 (second resistor) and a switch S2 (second switch) are connected in series, and the other series circuit (second potential change circuit) in which a resistor R3 (third resistor) and a switch S3 (third switch) are connected in series. These series circuits are connected in parallel with charging control unit 42.

Switches S2 and S3 of external power supply enabling circuit 43 are formed of semiconductor switches such as transistors, and the turning of switches S2 and S3 on and off are controlled by charging control unit 42.

Charging control unit 42 controls the turning of switches S2 and S3 on and off to change the potential of pilot signal line LP.

Such a change in the potential of pilot signal line LP is configured to serve as a power supply enable command to CPLT control circuit 32.

Capacitor charging circuit 44 is provided on the charging path. The charging path connects pilot signal line LP, which is between diode D3 (third diode) and external power supply enabling circuit 43, with a power source terminal 42A of charging control unit 42.

Capacitor charging circuit 44 has the series connection circuit and capacitor C, in which the series connection circuit connects a resistor R1 (first resistor), a normally closed switch S1 (first switch), and a diode D1 (first diode) in series, and capacitor C is provided in the circuit that connects the charging path, which is between the series connection circuit and power source terminal 42A, with ground GND.

That is, the charging path has resistor R1, switch S1, and diode D1, arranged in this order from pilot signal line LP, and diode D1 is connected such that the anode is toward switch S1 and the cathode is toward charging control unit 42.

Capacitor C is arranged in the circuit that connects the charging path, which is between diode D1 and power source terminal 42A, with ground GND.

Capacitor charging circuit 44 having capacitor C, resistor R1, switch S1, and diode D1 constitutes the power supply unit that supplies power to charging control unit 42.

Charging control unit 42 controls the turning of switch S1 on and off, and when switch S1 is turned on, a charge is stored in capacitor C.

Furthermore, power source terminal 42A of charging control unit 42 is connected to auxiliary battery 7 via a diode D2 (second diode).

Diode D2 is arranged such that the anode is toward auxiliary battery 7 and the cathode is toward power source terminal 42A.

If auxiliary battery 7 is low, capacitor C is used as the power source for charging control unit 42 instead of auxiliary battery 7.

DC/DC converter 5 steps down a predetermined DC voltage that is output by charging circuit 41 and a voltage of vehicle driving battery 1.

Auxiliary battery 7 is the drive source for in-vehicle devices such as various Electronic Control Units (ECUs) and auxiliary devices, and is constituted by the secondary battery such as a lead storage battery.

Auxiliary battery 7 is charged by the output voltage of DC/DC converter 5.

The ECUs that use auxiliary battery 7 as the motive power source include a vehicle ECU 8 that controls the operation of vehicle 101, a battery ECU 9 that monitors vehicle driving battery 1, other ECU 10, and the like.

Battery ECU 9, for example, measures the voltage, current, temperature, and the like of vehicle driving battery 1, and performs cooling management of vehicle driving battery 1.

Vehicle ECU 8 controls the turning on and off (opening and closing) of switching devices S4, S5 that are arranged between DC/DC converter 5 and vehicle driving battery 1.

Furthermore, PCM 11 is provided between DC/DC converter 5 and switching devices S4 and S5. PCM 11 collectively represents the electric power converter that receives electric power from the driving battery to provide motive power. For example, it represents the inverter for driving a motor.

As described above, the input side of charging circuit 41 is connected to external power source 2 via switching devices S6 and S7, and the output side of charging circuit 41 is connected to vehicle driving battery 1 in the order of DC/DC converter 5 and switching devices S4 and S5, in which DC/DC converter 5 is connected to auxiliary battery 7.

In other words, DC/DC converter 5 is arranged between charging circuit 41 and vehicle driving battery 1, switching devices S4 and S5 are arranged between DC/DC converter 5 and vehicle driving battery 1, and auxiliary battery 7 is connected to DC/DC converter 5.

That is, DC/DC converter 5 is directly and electrically connected to the output side of charging circuit 41 without going through switching devices S4 and S5, while vehicle driving battery 1 is electrically connected to the output side of charging circuit 41 and DC/DC converter 5 via switching devices S4 and S5.

Thus, vehicle charging system 100 includes switching devices S4, S5 that electrically disconnect vehicle driving battery 1 from charging circuit 41 and from DC/DC converter 5, which is connected to charging circuit 41.

According to this configuration, when switching devices S4, S5 are off (open), vehicle driving battery 1 is electrically disconnected from the output side of charging circuit 41 and DC/DC converter 5, while DC/DC converter 5 is electrically connected to the output side of charging circuit 41. Thus, DC/DC converter 5 may step down the output voltage of charging circuit 41 to charge auxiliary battery 7.

On the other hand, when switching devices S4 and S5 are on (closed), vehicle driving battery 1 is electrically connected to the output side of charging circuit 41 and DC/DC converter 5. Thus, the output of charging circuit 41 may charge vehicle driving battery 1, and DC/DC converter 5 may step down the high voltage of vehicle driving battery 1 to charge auxiliary battery 7.

Figure 2:
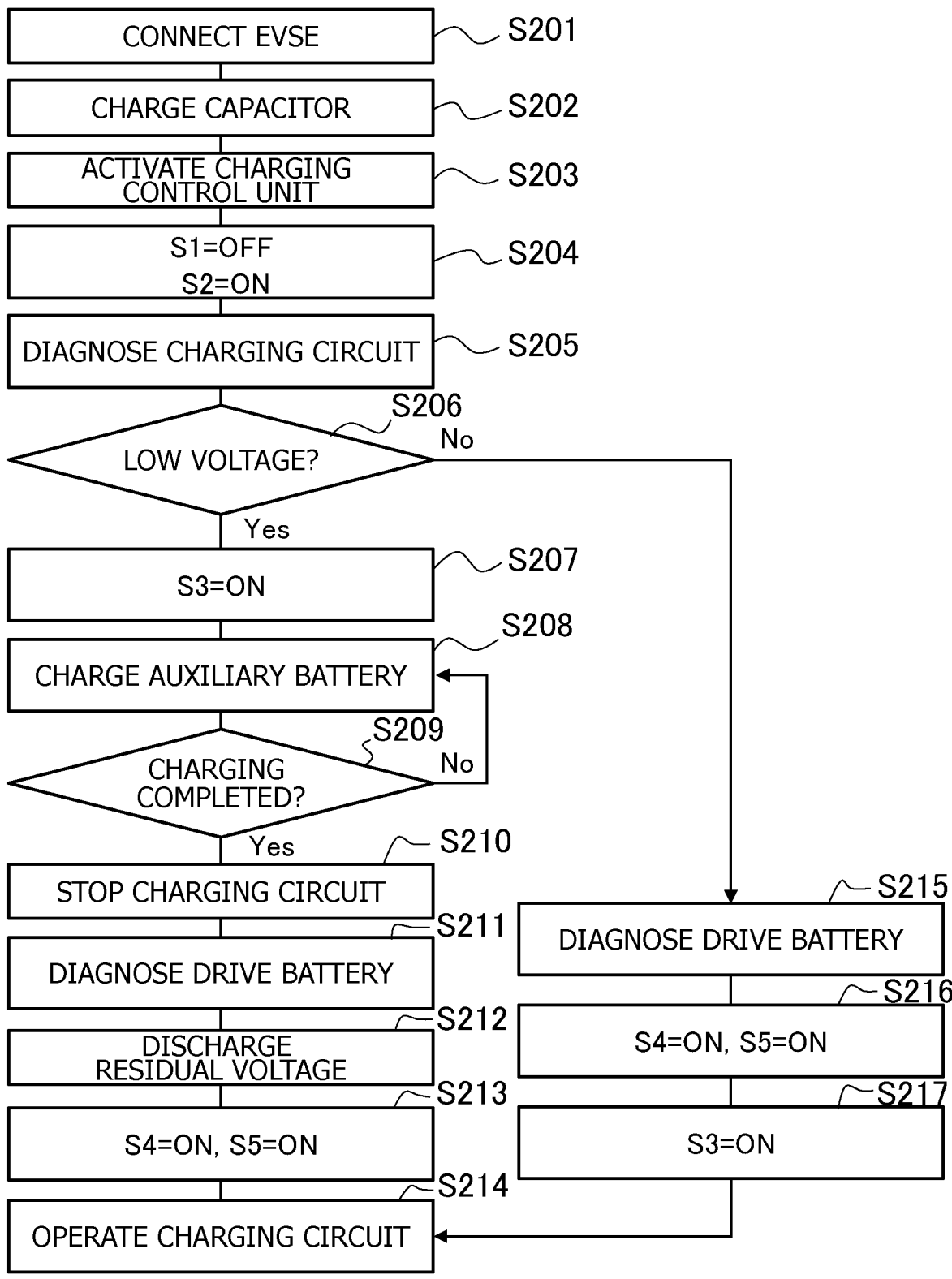
FIG. 2 is a flow chart illustrating a first embodiment of a charging process.

The flowchart in FIG. 2 illustrates the charging process of vehicle driving battery 1 and auxiliary battery 7 when EVSE 3 is connected to vehicle 101, in other words, a first embodiment of the process of the vehicle charging control method carried out by vehicle charging apparatus 4.

In step S201, EVSE 3 is connected to vehicle 101 by the charging cable.

At this time, because switching devices S6 and S7 of EVSE 3 are in the off state (open state), no electric circuit for electrically connecting external power source 2 and charging circuit 41 is formed.

On the other hand, when EVSE 3 is connected to vehicle 101, CPLT control circuit 32 is connected to vehicle 101 side of pilot signal line LP, and a 12V DC pilot signal CPLT is output from CPLT control circuit 32 to pilot signal line LP.

In step S202, 12V pilot signal CPLT output from CPLT control circuit 32 to pilot signal line LP is applied to capacitor C through the charging path that includes diode D3, resistor R1, normally closed switch S1, and diode D1, and capacitor C is charged by pilot signal CPLT.

Next, charging control unit 42 is activated in step S203.

Here, if the voltage of auxiliary battery 7 at the time EVSE 3 is connected to vehicle 101 is sufficient to drive the microcomputer of charging control unit 42, the microcomputer of charging control unit 42 may be activated by using auxiliary battery 7 as the power source.

On the other hand, if the voltage of auxiliary battery 7 at the time EVSE 3 is connected to vehicle 101 is not sufficient to drive the microcomputer of charging control unit 42, the power source that may activate charging control unit 42 is not secured.

However, when EVSE 3 is connected to vehicle 101, pilot signal CPLT is used to start charging capacitor C, and when the charging of capacitor C progresses and the charging voltage of capacitor C exceeds the voltage required for the operation of charging control unit 42, capacitor C supplies power to activate charging control unit 42.

In step S204, activated charging control unit 42 executes control to turn off switch S1 of capacitor charging circuit 44 to stop charging capacitor C, and also executes control to turn on switch S2 of external power supply enabling circuit 43.

When switch S2 is turned on, the potential of pilot signal line LP is changed from 12V to 9V, for example.

CPLT control circuit 32 detects such a change in the potential of pilot signal line LP as a state in which vehicle 101 is connected to vehicle charging apparatus 4.

In step S205, communication starts between CPLT control circuit 32 and charging control unit 42, and CPLT control circuit 32 outputs a pulsed pilot signal CPLT to pilot signal line LP.

Here, the pulse width of pilot signal CPLT that is output by CPLT control circuit 32 is set to a value corresponding to the supply current capacity of external power source 2, and charging control unit 42 detects the supply current capacity of external power source 2 from the pulse width of acquired pilot signal CPLT.

That is, CPLT control circuit 32 performs Pulse Width Modulation (PWM) that changes the pulse width of pilot signal CPLT according to the supply current capacity of external power source 2.

Furthermore, charging control unit 42 that has started communicating with CPLT control circuit 32 carries out a failure diagnosis.

In this failure diagnosis, charging control unit 42 diagnoses whether or not charging circuit 41 of vehicle charging apparatus 4 or the like is abnormal.

In step S206, charging control unit 42 determines whether or not the voltage of auxiliary battery 7 is below the set voltage (allowable minimum voltage).

If the voltage of auxiliary battery 7 is below the set voltage, in other words, if auxiliary battery 7 needs to be charged, in step S207, charging control unit 42 further reduces the potential of pilot signal line LP from, for example, 9V to 6V, by turning on switch S3 of external power supply enabling circuit 43 while switch S2 of external power supply enabling circuit 43 is maintained on.

When CPLT control circuit 32 detects that the potential of pilot signal line LP has reached 6V, CPLT control circuit 32 recognizes that charging control unit 42 has enabled power supply from external power source 2, and thus, executes control to turn on (close) switching devices S6 and S7.

In other words, when the conditions for starting power supplying from external power source 2 are met, charging control unit 42 instructs CPLT control circuit 32 to start power supplying by turning on switch S3 and switching the potential of pilot signal line LP to a prescribed voltage.

When CPLT control circuit 32 executes control to turn on switching devices S6 and S7, external power source 2 is electrically connected to the input side of charging circuit 41 so that external power source 2 starts supplying AC voltage to charging circuit 41.

In step S208, charging control unit 42 starts actuating charging circuit 41 and DC/DC converter 5.

When charging circuit 41 and DC/DC converter 5 are actuated, charging circuit 41 converts the AC voltage supplied from external power source 2 into a predetermined DC voltage, DC/DC converter 5 steps down the predetermined DC voltage output by charging circuit 41, and the output voltage of this DC/DC converter 5 charges auxiliary battery 7.

At this time, because switching devices S4 and S5 are held in the off state (open state), vehicle driving battery 1 is not charged, and auxiliary battery 7, in which voltage has dropped, is charged before vehicle driving battery 1 is charged.

In other words, if the voltage of auxiliary battery 7 drops, switching devices S4 and S5 are closed and charging circuit 41 starts charging vehicle driving battery 1 after charging of auxiliary battery 7 starts.

In step S209, charging control unit 42 determines whether or not auxiliary battery 7 has been charged until its voltage has become equal to or greater than the set voltage.

If auxiliary battery 7 has not been sufficiently charged, charging control unit 42 continues the charging operation of auxiliary battery 7.

On the other hand, if auxiliary battery 7 has been charged until its voltage has reached equal to or greater than the set voltage, charging control unit 42 temporarily stops the actuation of charging circuit 41 in step S210.

In step S211, charging control unit 42 activates vehicle ECU 8, battery ECU 9, and the like that use auxiliary battery 7 as the drive source. In other words, charging control unit 42 outputs a trigger signal that activates vehicle ECU 8, battery ECU 9, and the like.

Activated battery ECU 9 carries out diagnosis of vehicle driving battery 1, for example.

Vehicle ECU 8 and battery ECU 9 are activated, for example, by a signal from the main switch of vehicle 101, except during charging of vehicle driving battery 1.

In step S212, charges stored in the capacitors in charging circuit 41 and DC/DC converter 5 are discharged.

Next, in step S213, vehicle ECU 8 executes control to turn switching devices S4 and S5 to the on state (closed state) and connects vehicle driving battery 1 to the output side of charging circuit 41 so that vehicle driving battery 1 is in the chargeable state.

In step S214, charging control unit 42 actuates charging circuit 41 again to start charging vehicle driving battery 1.

That is, if the voltage of auxiliary battery 7 drops, vehicle charging apparatus 4 first charges auxiliary battery 7. When charging of auxiliary battery 7 is completed, vehicle charging apparatus 4 temporarily stops the actuation of charging circuit 41, and after switching devices S4 and S5 are turned on, actuates charging circuit 41 to start charging vehicle driving battery 1.

On the other hand, if charging control unit 42 determines that the voltage of auxiliary battery 7 is equal to or greater than the set voltage in step S206, in other words, if charging control unit 42 determines that charging of auxiliary battery 7 is not required, the process proceeds to step S215, and charging control unit 42 activates vehicle ECU 8, battery ECU 9, and the like, which use auxiliary battery 7 as the drive source.

Next, in step S213, vehicle ECU 8 executes control to turn switching devices S4 and S5 to the on state (closed state) and connects vehicle driving battery 1 to the output side of charging circuit 41 so that vehicle driving battery 1 is in the chargeable state.

In step S217, charging control unit 42 further reduces the potential of pilot signal line LP from 9V to 6V by turning on switch S3 of external power supply enabling circuit 43 while switch S2 of external power supply enabling circuit 43 is maintained on.

When CPLT control circuit 32 detects that the potential of pilot signal line LP has reached 6V, CPLT control circuit 32 recognizes that charging control unit 42 has enabled power supply from external power source 2, and thus, executes control to turn on (close) switching devices S6 and S7.

Next, in step S214, charging control unit 42 actuates charging circuit 41 to start charging vehicle driving battery 1.

According to vehicle charging apparatus 4, the vehicle charging control method, and vehicle charging system 100, it is possible to ensure the safety of charging and allow stable charging of vehicle driving battery 1 even when auxiliary battery 7 is in the voltage drop situation.

That is, vehicle driving battery 1 may be charged safely, because switching devices S4 and S5 may electrically disconnect vehicle driving battery 1 from charging circuit 41.

In addition, if auxiliary battery 7, which serves as the power source for opening and closing switching devices S4 and S5, has its voltage drop, auxiliary battery 7 is first charged by external power source 2, and thus, high-voltage switching devices S4 and S5 may be stably controlled.

Therefore, even if the voltage of auxiliary battery 7 is low at the time EVSE 3 is connected to vehicle 101, switching devices S4 and S5 may be reliably controlled to start charging vehicle driving battery 1.

For example, if auxiliary battery 7 is in the voltage drop situation in a system in which switching devices are arranged between vehicle driving battery 1 or DC/DC converter 5 and charging circuit 41, and in which auxiliary battery 7 and vehicle driving battery 1 are charged in parallel, the power source for controlling switching devices S4 and S5 may not be sufficiently secured and charging may not be possible even if EVSE 3 is connected to the vehicle.

That is, if auxiliary battery 7 is discharged and is in the voltage drop situation because of a user who owns vehicle 101 and leaves vehicle 101 unattended, switching devices S4 and S5 cannot be controlled and charging cannot be performed even if a home charger is connected, and thus, auxiliary battery 7 may need to be replaced.

In contrast, according to vehicle charging apparatus 4, vehicle charging control method, and vehicle charging system 100 described above, if auxiliary battery 7 is in the voltage drop situation at the time EVSE 3 is connected, auxiliary battery 7 is first charged by external power source 2 so that the power source for controlling switching devices S4 and S5 (in other words, the power source for charging control unit 42 that carries out the charging control, vehicle ECU 8, and battery ECU 9) is secured, and then switching devices S4 and S5 are controlled to turn on to start charging vehicle driving battery 1.

Therefore, even if auxiliary battery 7 is in the voltage drop situation, vehicle driving battery 1 may be charged without replacing auxiliary battery 7.

According to the charging process illustrated in the flowchart of FIG. 2, when charging of auxiliary battery 7 is completed, the operation of charging circuit 41 is temporarily stopped, and then switching devices S4 and S5 are controlled to turn on to later resume the operation of charging circuit 41. In this manner, an overcurrent is prevented from flowing when switching devices S4 and S5 are turned on.

In contrast, if switching devices S4 and S5 are on-controlled in the state in which charging control unit 42 sets the output voltage of charging circuit 41 to be equal to the voltage of vehicle driving battery 1, an overcurrent may be prevented from flowing, and at the same time, switching devices S4 and S5 may be turned on while charging circuit 41 continues to operate.

Figure 3:
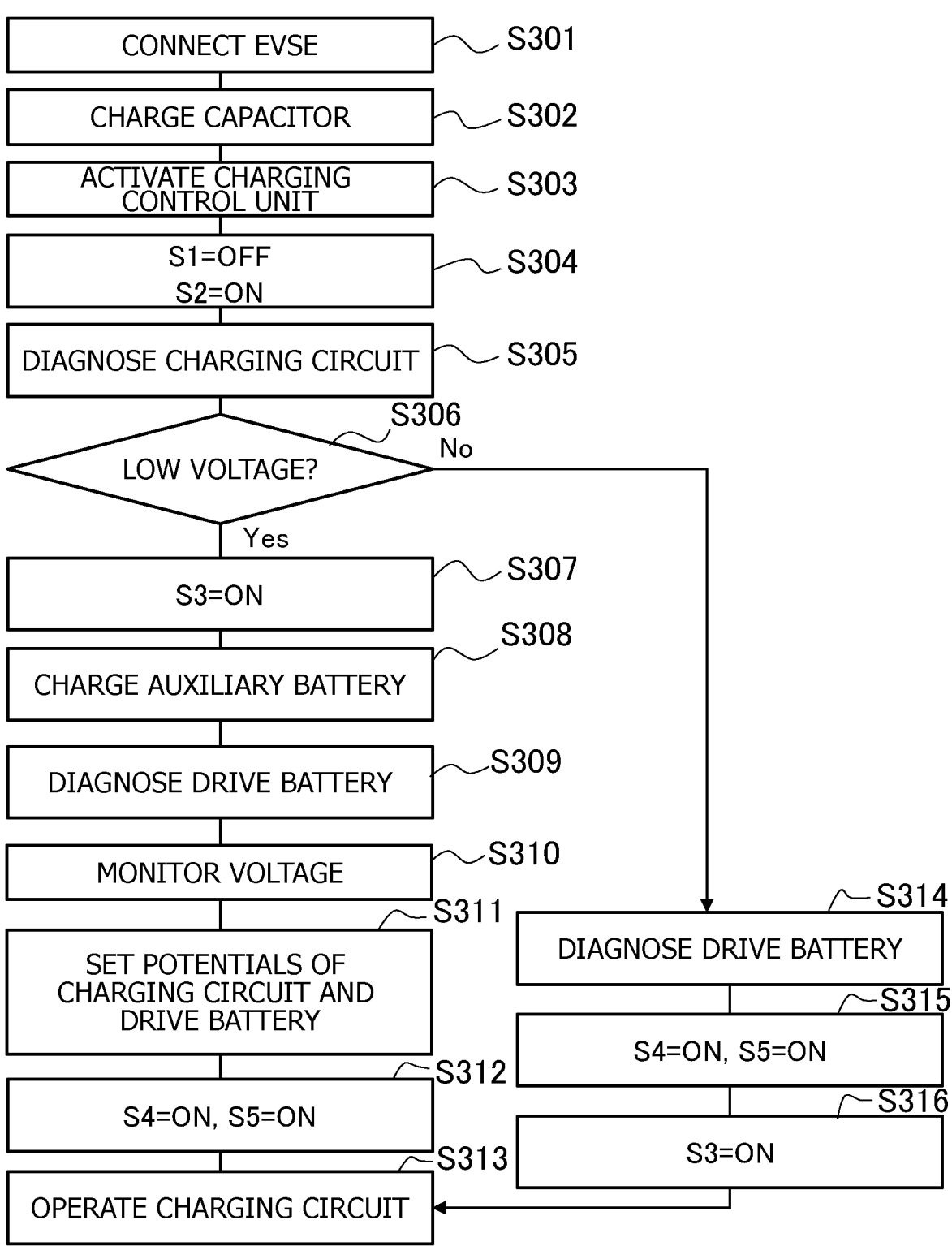
FIG. 3 is a flow chart illustrating a second embodiment of the charging process.

The flow chart of FIG. 3 illustrates a second embodiment of the charging process in which switching devices S4 and S5 are turned on while charging circuit 41 continues to operate.

The processing details in steps S301 to S307 in the flowchart of FIG. 3 are the same as those in steps S201 to S207 in the flowchart of FIG. 2, and the processing details in steps S314 to S316 in the flowchart of FIG. 3 are the same as those in steps S215 to S217 in the flowchart of FIG. 2.

For this reason, detailed description of the processing details of steps S301 to S307 and steps S314 to S316 will be omitted. In the following, processing details of steps S308 to S313 will be mainly described.

When external power source 2 starts supplying AC power source in the state in which the voltage of auxiliary battery 7 is low, charging control unit 42 starts actuating charging circuit 41 and DC/DC converter 5 in step S308.

In step S309, charging control unit 42 activates vehicle ECU 8, battery ECU 9, and the like, that use auxiliary battery 7 as the drive source, and causes battery ECU 9 to carry out diagnosis of vehicle driving battery 1, for example.

Next, in step S310, charging control unit 42 acquires a signal indicating the voltage value of vehicle driving battery 1 from battery ECU 9.

In step S311, charging control unit 42 controls charging circuit 41 so that the output voltage value of charging circuit 41 has the same potential as the voltage value of vehicle driving battery 1.

In step S312, in the state in which the output voltage value of charging circuit 41 and the voltage value of vehicle driving battery 1 have the same potential, vehicle ECU 8 executes control to turn switching devices S4 and S5 to the on state (closed state) and connects vehicle driving battery 1 to the output side of charging circuit 41 so that vehicle driving battery 1 is in the chargeable state.

In step S313, vehicle driving battery 1 is charged by the output voltage of charging circuit 41.

According to this charging process, in the state in which the output voltage value of charging circuit 41 and the voltage value of vehicle driving battery 1 have the same potential, switching devices S4 and S5 are controlled to the on state, and thus, an overcurrent is prevented from flowing through switching devices S4 and S5 when these switches are switched from off to on.

Furthermore, according to the above charging process, although charging of auxiliary battery 7 starts first, charging of vehicle driving battery 1 starts without waiting for the charging of auxiliary battery 7 to be completed, and thus, charging of vehicle driving battery 1 starts earlier, and time to complete charging of vehicle driving battery 1 is shortened.

Furthermore, there is no need for charging control unit 42 to perform the process of diagnosing the charge amount of auxiliary battery 7 after charging starts.

Furthermore, by accelerating the activation of battery ECU 9 and the like that use auxiliary battery 7 as the power source, the charging state may be quickly notified to the operator who performs the charging work.

Vehicle charging apparatus 4 illustrated in FIG. 1 includes capacitor charging circuit 44 as the power supply unit that supplies power to charging control unit 42 in place of auxiliary battery 7; however, the power supply unit is not limited to capacitor charging circuit 44.

For example, instead of capacitor charging circuit 44, vehicle charging apparatus 4 may include, as the power supply unit, the battery power supply unit that supplies power from the battery to charging control unit 42.

The battery in the battery power supply unit may, for example, be a primary battery and a rechargeable dry cell battery.

Figure 4:
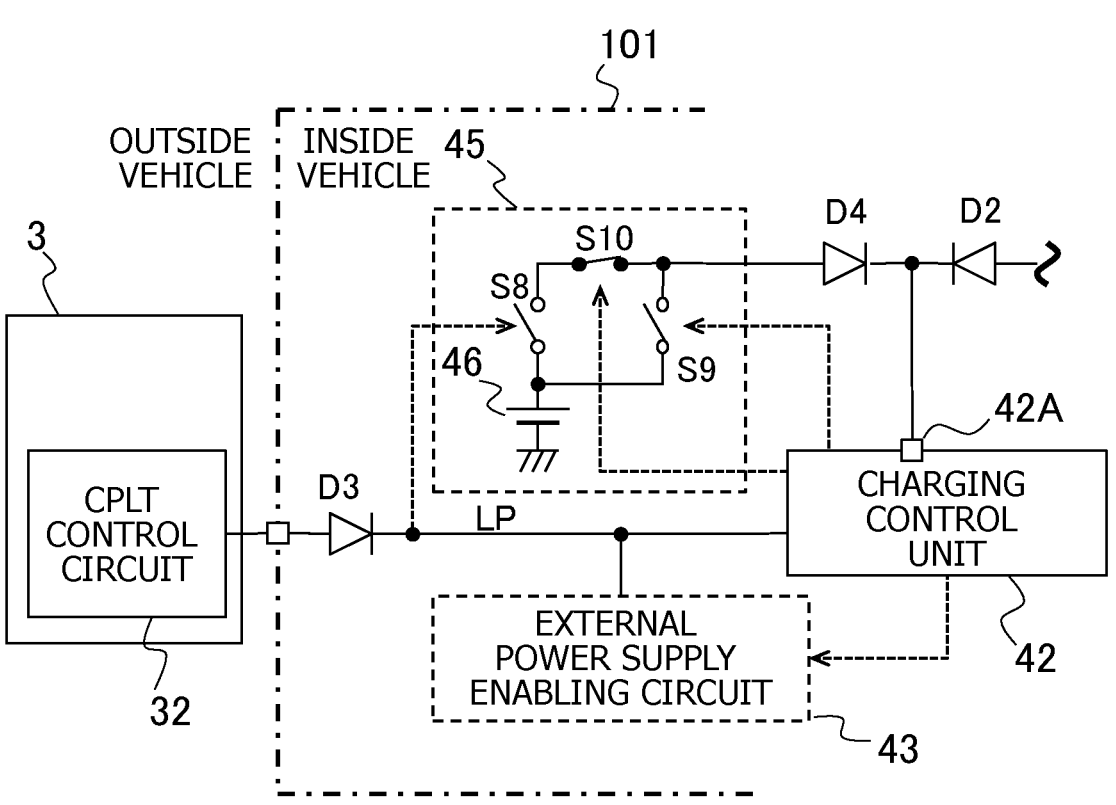
FIG. 4 is a configuration diagram illustrating another aspect of a power supply unit.

FIG. 4 is a configuration diagram of the main part of vehicle charging system 100, illustrating a third embodiment that employs the battery power supply unit as the power supply unit.

A battery power supply unit 45 illustrated in FIG. 4 is one aspect of the power supply unit that replaces capacitor charging circuit 44, and includes a battery 46 and supplies power from battery 46 to charging control unit 42.

Battery power supply unit 45 includes battery 46, a switch S8, a switch S9, a switch S10, and a diode D4.

More specifically, the power supply path that connects battery 46 with power source terminal 42A of charging control unit 42 is provided with switch S8, switch S10, and diode D4 that are connected in series, in this order, from battery 46.

Furthermore, switch S9 is connected in parallel to the series circuit of switches S8 and S10.

Furthermore, diode D4 is arranged such that the anode is toward battery 46 and the cathode is toward charging control unit 42.

Battery power supply unit 45 switches between supplying power and stopping supplying power from battery 46 to charging control unit 42 according to the turning on and off of switches S8, S9, and S10.

Switch S8 is configured to be turned on when pilot signal CPLT is at a high potential.

Charging control unit 42 controls the turning on and off of switches S9 and S10. Switch S9 is the normally open switch that is turned off in the control stop state, and switch S10 is the normally closed switch that is turned on in the control stop state.

As will be described later, when pilot signal CPLT becomes a pulsed signal and pilot signal CPLT cannot stably maintain the on state of switch S8, charging control unit 42 turns on switch S9 to continue power supply from battery 46 to charging control unit 42.

Figure 5:
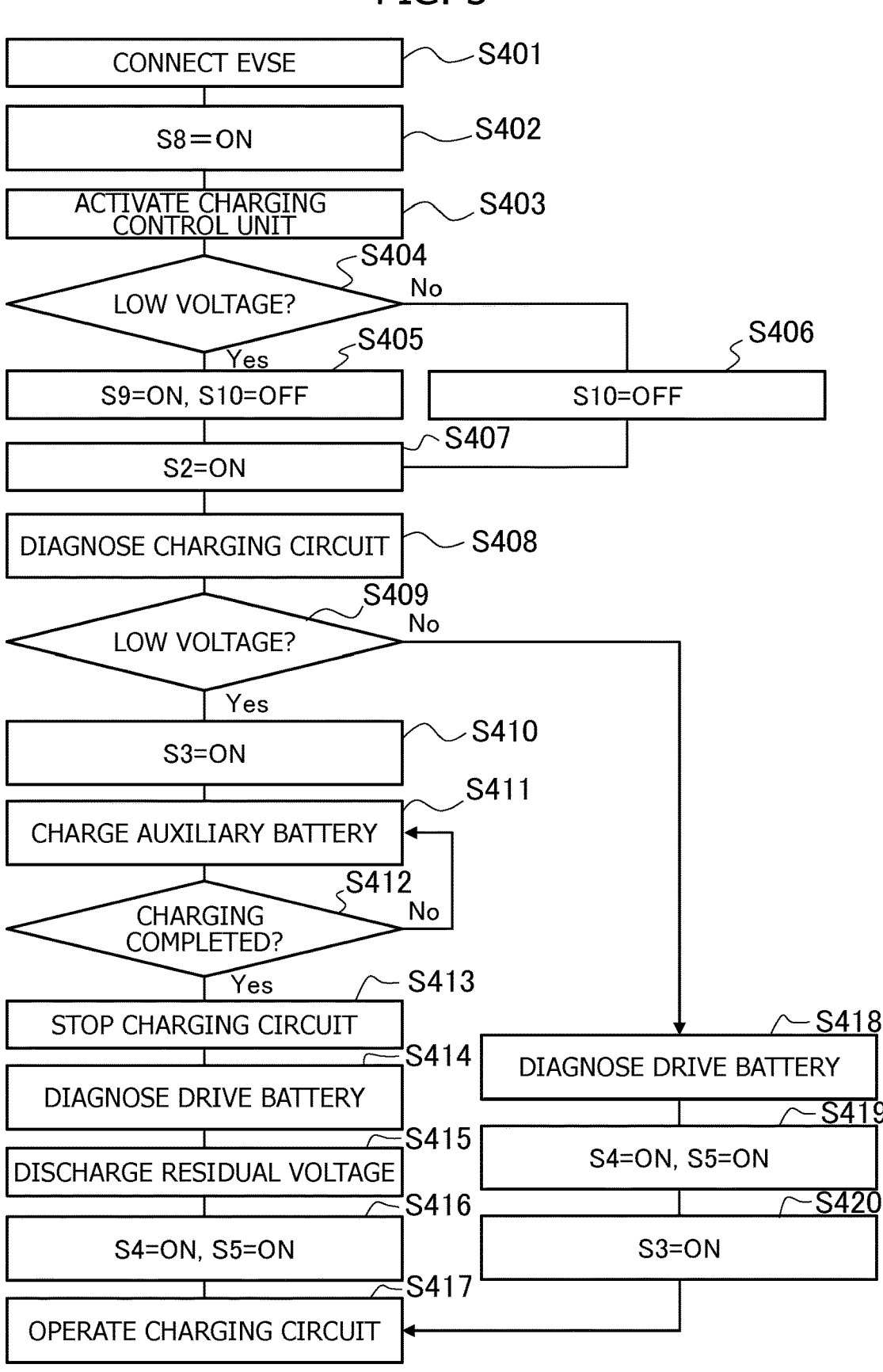
FIG. 5 is a flow chart illustrating a third embodiment of the charging process.

The flow chart of FIG. 5 illustrates the third embodiment of the charging process performed by vehicle charging apparatus 4 that includes battery power supply unit 45 illustrated in FIG. 4.

The processing details in steps S409 to S420 in the flowchart of FIG. 5 are the same as those in steps S206 to S217 in the flowchart of FIG. 2.

For this reason, detailed description of the processing details of steps S409 to S420 will be omitted. In the following, processing details of steps S401 to S408 will be described.

In step S401, EVSE 3 is connected to vehicle 101 by the charging cable.

When EVSE 3 is connected to vehicle 101, CPLT control circuit 32 and pilot signal line LP of vehicle 101 are connected, and a 12V DC pilot signal CPLT is output from CPLT control circuit 32 to pilot signal line LP.

As a result of outputting pilot signal CPLT, switch S8 is turned from off to on in the next step S402, and power is supplied from battery 46 to charging control unit 42 via switch S8, normally closed switch S10, and diode D4.

Then, as a result of supplying power from battery 46 (in other words, turning on power source), charging control unit 42 is activated in step S403.

In step S404, charging control unit 42 determines whether the voltage of auxiliary battery 7 is below the set voltage (allowable minimum voltage).

If the voltage of auxiliary battery 7 is below the set voltage and auxiliary battery 7 needs to be charged, charging control unit 42 turns on switch S9 of battery power supply unit 45 and turns off switch S10 in step S405.

Accordingly, the power supply path from battery 46 to charging control unit 42 is switched from the path passing through switches S8 and S10 to the path passing through switch S9 while bypassing switches S8 and S10.

Supplying power from battery 46 to charging control unit 42 via switch S9 allows stable power supply from battery 46 to charging control unit 42 even if pilot signal CPLT becomes a pulse signal and switch S8 cannot be stably turned on.

When the AC power source that is supplied from external power source 2 starts charging auxiliary battery 7, charging control unit 42 turns off switch S9 and shuts off the power supply from battery 46 to charging control unit 42.

In addition, if the voltage of auxiliary battery 7 is equal to or greater than the set voltage and charging of auxiliary battery 7 is not required, charging control unit 42 turns off switch S10 of battery power supply unit 45 and shuts off the power supply path from battery 46 to charging control unit 42 in step S406.

After the switches are controlled in step S405 or S406, charging control unit 42 turns on switch S2 of external power supply enabling circuit 43 to reduce the potential of pilot signal line LP from 12V to 9V in step S407.

In step S408, when CPLT control circuit 32 detects reduced potential of pilot signal line LP, communication starts between CPLT control circuit 32 and charging control unit 42, and CPLT control circuit 32 outputs pulsed pilot signal CPLT to pilot signal line LP.

Furthermore, charging control unit 42 that has started communication with CPLT control circuit 32 carries out a failure diagnosis on charging circuit 41 and the like.

The technical concepts described in the above embodiments can be combined as appropriate, as long as they do not conflict.

The present invention is described in detail above referring to exemplary embodiments, but it is obvious for those skilled in the art that the present invention encompasses various modifications based on the basic technical concepts and teachings of the present invention.

For example, vehicle charging system 100 illustrated in FIG. 4 may be configured such that an operator who performs charging work turns switch S8 on and off by manipulating the manual switch or the like that is provided in the vehicle.

Vehicle charging system 100 illustrated in FIG. 4 may also be configured such that, when a charging cable is connected to the vehicle, a contact is mechanically moved to turn on switch S8.

REFERENCE SYMBOL LIST

1 Vehicle driving battery
2 External power source
3 EVSE (electric circuit switching unit)
32 CPLT control circuit (switching control circuit)
4 Vehicle charging apparatus
41 Charging circuit
42 Charging control unit
43 External power supply enabling circuit
44 Capacitor charging circuit (power supply unit)
5 DC/DC converter
7 Auxiliary battery
8 Vehicle ECU (in-vehicle device)
9 Battery ECU (in-vehicle device)
100 Vehicle charging system
101 Vehicle
S4, S5 Switching device (second switching device)
S6, S7 Switching device (first switching device)

The invention claimed is:

1. A vehicle charging apparatus for charging a vehicle driving battery mounted in a vehicle from an external power source external to the vehicle, the vehicle charging apparatus comprising:

a charging circuit that charges the vehicle driving battery, an input side of the charging circuit being connected to the external power source via a first switching device and an output side of the charging circuit being connected to the vehicle driving battery in an order of a DC/DC converter and a second switching device, the DC/DC converter connected to an auxiliary battery that is a drive source for an in-vehicle device;

a charging control unit that controls the charging circuit and is connected to a signal line of a pilot signal output from a switching control circuit that controls the first switching device;

an external power supply enabling circuit connected to the signal line to change a potential of the signal line, and a power supply unit that supplies power to the charging control unit;

wherein the power supply unit is a capacitor charging circuit provided on a charging path that connects the signal line and the charging control unit, and the capacitor charging circuit supplies power to the charging control unit, and the capacitor charging circuit includes, in order from the signal line of the charging path, a first resistor, a first switch, a first diode arranged such that an anode is toward the first switch and a cathode is toward the charging control unit, and a capacitor.

2. The vehicle charging apparatus according to claim 1, wherein a path that connects the auxiliary battery and the charging control unit includes a second diode that is arranged such that an anode is toward the auxiliary battery and a cathode is toward the charging control unit.

3. The vehicle charging apparatus according to claim 2, wherein the signal line includes a third diode that is arranged toward the switching control circuit with respect to a connecting portion of the external power supply enabling circuit and the capacitor charging circuit, in which an anode is toward the switching control circuit and a cathode is toward the charging control unit.

4. The vehicle charging apparatus according to claim 3, wherein the external power supply enabling circuit includes a first potential change circuit having a second resistor and a second switch, and a second potential change circuit having a third resistor and a third switch.

5. A vehicle charging control method carried out in order to charge a vehicle driving battery mounted in a vehicle from an external power source external to the vehicle, the vehicle charging control method carried out by a vehicle charging apparatus mounted in the vehicle, the vehicle charging apparatus comprising:

a charging circuit that charges the vehicle driving battery, an input side of the charging circuit being connected to the external power source via a first switching device and an output side of the charging circuit being connected to the vehicle driving battery in the order of a DC/DC converter and a second switching device, the DC/DC converter connected to an auxiliary battery that is a drive source for an in-vehicle device;

a charging control unit that controls the charging circuit and is connected to a signal line of a pilot signal output from a switching control circuit that controls the first switching device;

an external power supply enabling circuit connected to the signal line to change a potential of the signal line, and a power supply unit that supplies power to the charging control unit, the power supply unit being a capacitor charging circuit provided on a charging path that connects the signal line and the charging control unit, and the capacitor charging circuit supplies power to the charging control unit, and the capacitor charging circuit includes, in order from the signal line of the charging path, a first resistor, a first switch, a first diode arranged such that an anode is toward the first switch and a cathode is toward the charging control unit, and a capacitor the vehicle charging control method comprising:

when a voltage of the auxiliary battery drops, actuating, by the charging control unit, the charging circuit in a state in which the second switching device is open, and starting charging the auxiliary battery by the DC/DC converter; and after starting charging the auxiliary battery, closing the second switching device, and starting charging the vehicle driving battery by the charging circuit.

6. A vehicle charging system comprising:

a vehicle driving battery mounted in a vehicle;

an external power source external to the vehicle;

an electric circuit switching unit connected to the external power source, the electric circuit switching unit having a first switching device and a switching control circuit that controls the first switching device;

a vehicle charging apparatus connected to the electric circuit switching unit, the vehicle charging apparatus including a charging circuit connected to the first switching device, a charging control unit connected to a signal line of a pilot signal output from the switching control circuit so as to control the charging circuit, an external power supply enabling circuit connected to the signal line to change a potential of the signal line, and a power supply unit that supplies power to the charging control unit, the power supply unit being a capacitor charging circuit provided on a charging path that connects the signal line and the charging control unit, and the capacitor charging circuit supplies power to the charging control unit, and the capacitor charging circuit includes, in order from the signal line of the charging path, a first resistor, a first switch, a first diode arranged such that an anode is toward the first switch and a cathode is toward the charging control unit, and a capacitor;

a DC/DC converter arranged between the charging circuit and the vehicle driving battery;

a second switching device arranged between the DC/DC converter and the vehicle driving battery; and an auxiliary battery that is connected to the DC/DC converter and is a drive source for an in-vehicle device.

* * * * *